United States Patent
Khanka et al.

(10) Patent No.: US 8,125,919 B1
(45) Date of Patent: Feb. 28, 2012

(54) METHOD AND SYSTEM FOR SELECTIVELY RELEASING NETWORK RESOURCES

(75) Inventors: Bhagwan Khanka, Lenexa, KS (US); Anoop K. Goyal, Overland Park, KS (US); Shilpa Kowdley Srinivas, Herndon, VA (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

(21) Appl. No.: 12/409,599

(22) Filed: Mar. 24, 2009

(51) Int. Cl.
*G01R 31/08* (2006.01)

(52) U.S. Cl. .................................. 370/252; 370/329

(58) Field of Classification Search .................. 370/252, 370/230, 329; 455/452, 522
See application file for complete search history.

(56) References Cited

U.S. PATENT DOCUMENTS

| 6,078,817 A | 6/2000 | Rahman | |
|---|---|---|---|
| 2008/0014956 A1* | 1/2008 | Balasubramanian | 455/452.1 |
| 2008/0153535 A1* | 6/2008 | Gorokhov et al. | 455/522 |

* cited by examiner

*Primary Examiner* — Ricky Ngo
*Assistant Examiner* — David Oveissi

(57) ABSTRACT

A method and system for selectively releasing air interface traffic channels in a wireless coverage area, based on a delta between the signal quality of a traffic channel assigned to a wireless communication device and the aggregate signal quality of all the traffic channels assigned to the wireless communication device.

12 Claims, 6 Drawing Sheets

| TIME SLOT TS1 | TIME SLOT TS2 | TIME SLOT TS3 | TIME SLOT TS4 | TIME SLOT TS5 |
|---|---|---|---|---|
| AP 1 | AP 2 | | AP 3 | AP 4 / AP 5 |

404:

| TIME SLOT TS1 | TIME SLOT TS2 | TIME SLOT TS3 | TIME SLOT TS4 | TIME SLOT TS5 |
|---|---|---|---|---|
| | AP 6 | AP 7 / AP 8 | | AP 9 |

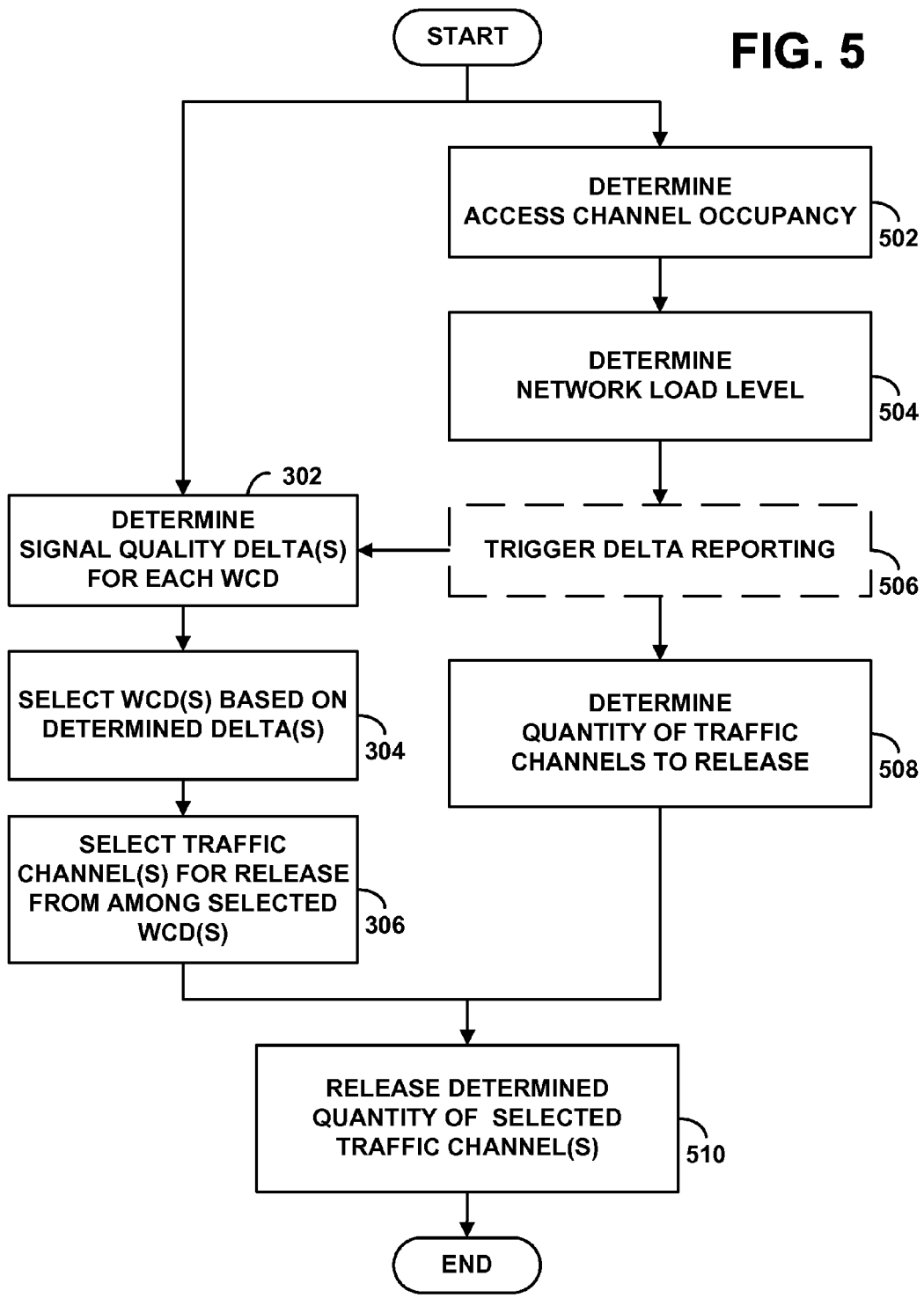

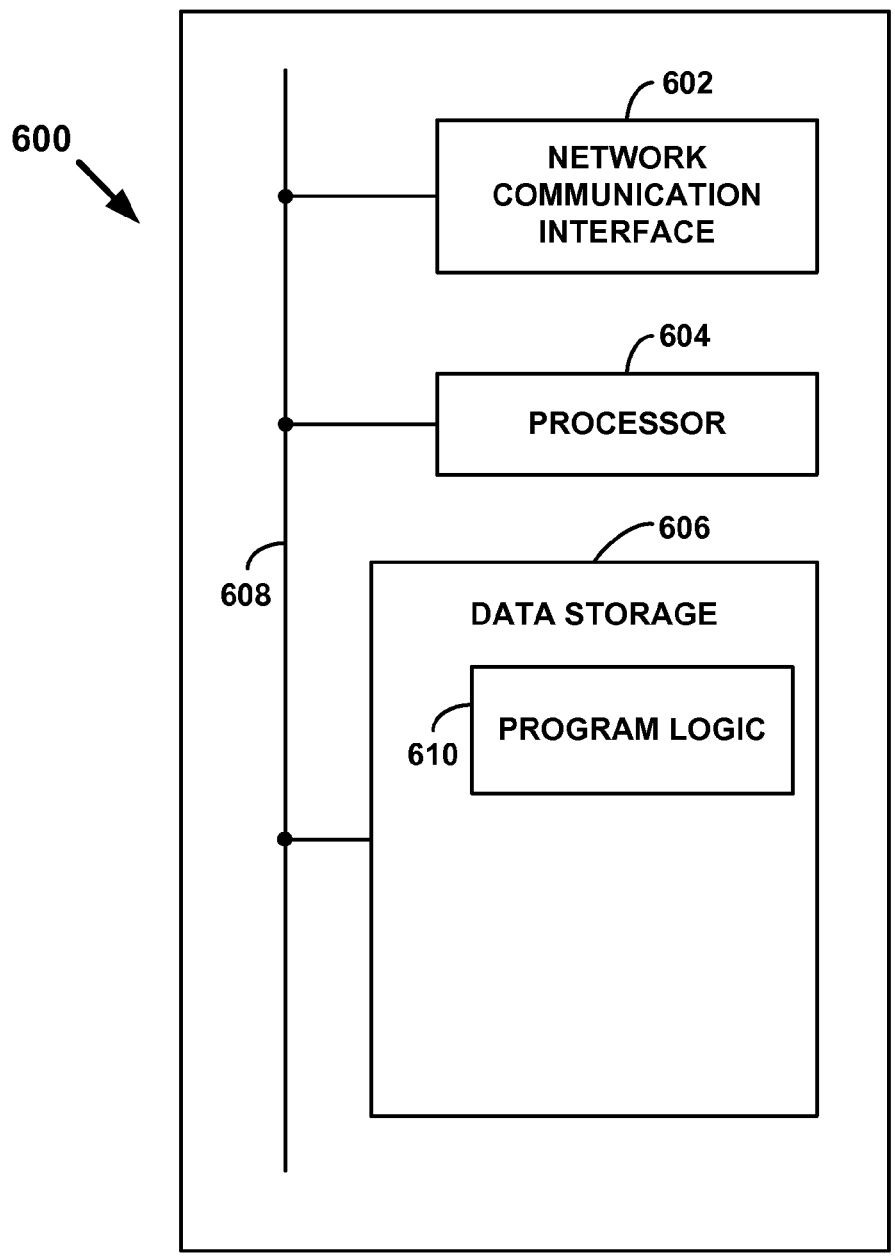

METHOD AND SYSTEM FOR SELECTIVELY RELEASING NETWORK RESOURCES

BACKGROUND

In a typical radio access network (RAN), such as cellular wireless communication system, an area is geographically divided into a number of cells and cell sectors, each defined by a radio frequency (RF) radiation pattern from a respective base transceiver station (BTS) antenna. The BTS antennae may be coupled to a BTS, and the BTS may be coupled with a base station controller (BSC), which may in turn be coupled with a switch or gateway that provides connectivity with a transport network such as the public switched telephone network (PSTN) and/or the Internet. For instance, a BSC may be coupled with a mobile switching center (MSC) that provides connectivity with the PSTN and/or a BSC may be coupled with a packet gateway, such as a packet data serving node (PDSN) or media gateway (MG) that provides connectivity with the Internet.

When a wireless communication device (WCD), such as a cellular telephone, pager, or wirelessly-equipped computer is positioned in a cell, the WCD communicates via an RF air interface with the BTS antennae of the cell. Consequently, a communication path can be established between the WCD and the transport network, via the air interface, the BTS, the BSC and the switch or gateway. Because cells may overlap, a WCD may communicate via multiple RF air interfaces with multiple BTS antennae in multiple cells.

Further, in many wireless communication systems, multiple BTSs may be connected with a common BSC, and multiple BSCs may be connected with a common switch or gateway. Each BSC may then manage air interface resources for multiple wireless coverage areas (e.g., multiple cells and sectors) by performing functions such as assigning and removing components of each air interface, such as traffic channels for use by WCDs in the coverage areas, and orchestrating handoff of calls between coverage areas. Alternatively or additionally, the common switch and/or gateway, in turn, may control one or more BSCs and may generally control wireless communications by performing functions such as receiving and processing call requests, instructing BSCs when to assign traffic channels, paging WCDs, and managing handoff of calls between BSCs.

Within wireless networks, each air interface may include one or more channels that typically operate as communication channels to carry communications between a BTS and a WCD. To utilize the air interface channels, the network must devote network resources to each channel. For example, the network may use specific bandwidth within a defined frequency spectrum for the channels. Also, the network may require power amplifiers, channel element hardware, and other equipment to create and maintain these air interface channels. Further, the network may devote additional resources, such as hardware interconnect bandwidth and processing power, to the creation and maintenance of each channel. The number of channels within a wireless network may be limited by the resources available to create and maintain those channels.

The channels may include, for example, traffic channels carrying voice and data communication and administrative channels, such as paging and access channels. Various transmission schemes may operate differently to define these channels. For example, frequency division multiple access (FDMA) networks may divide a given wireless spectrum into channels by the frequency domain. Time division multiple access (TDMA) networks may further divide the spectrum into channels by the time domain as well. A code division multiple access (CDMA) transmission scheme may operate by encoding channels across some or all of the spectrum by means of a finite number of Walsh codes.

A particular problem exists when a plurality of air interface traffic channels, which are necessarily limited by available network resources, are exclusively assigned to WCDs, but each WCD does not completely utilize all the traffic channels exclusively assigned to it. For example, a WCD may have four traffic channels assigned to it, but may actively use only one traffic channel for communication. Consequently, the remaining three traffic channels are not used for communication by the WCD, but they are also not available to carry traffic for other WCDs attempting to communicate on the wireless network. As a result, even though many of the traffic channels are not actually in active use, network resources are still devoted to their maintenance and the network can become overloaded due to a lack of available, usable network resources.

OVERVIEW

Disclosed herein are methods and systems for selectively releasing network resources used in a wireless coverage area, in order to allow more efficient use of the limited resources. For example, in a wireless communication system in which a RAN serves a plurality of WCDs, each WCD may have a plurality of assigned air interface traffic channels through which each WCD communicates with the RAN. Each assigned air interface traffic channel consumes network resources and may define a channel signal quality. A method for selectively releasing network resources within such a wireless communication system may comprise, for each WCD, determining at least a delta between (i) the signal quality of one of the air interface traffic channels assigned to the WCD and (ii) the aggregate signal quality of all the air interface traffic channels assigned to the WCD. Based on the determined deltas of each of the WCDs, one or more of the WCDs are selected. For each selected WCD, at least one of the WCD's assigned air interface traffic channels, but less than all of the WCD's assigned air interface traffic channels, are selected for release and then released, thereby making network resources associated with the released air interface traffic channel available for use by other WCDs.

The foregoing as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 4 is a table illustrating exemplary access channel timeslots;

FIG. 5 is a flow chart depicting functions carried out in accordance with an exemplary embodiment; and FIG. 6 is a block diagram of a network entity arranged to carry out functions of an exemplary embodiment.

DETAILED DESCRIPTION

While one or more embodiments are discussed generally in the context of CDMA wireless communication systems, it will be appreciated that the method is not limited in this respect and that the method may be implemented in any number of types of wireless communication systems, such as time division multiple access (TDMA) systems, global system for mobile communications (GSM) systems, or Worldwide Interoperability for Microwave Access (WiMAX or IEEE 802.16), for example. As in most telecommunication and data applications, it will also be appreciated that many of the elements of the various embodiments described herein are functional entities that may be implemented with hardware, firmware and/or software. Additionally, many of these elements may be implemented as discrete components or in conjunction with other components, in any suitable combination and location.

Figure 1:
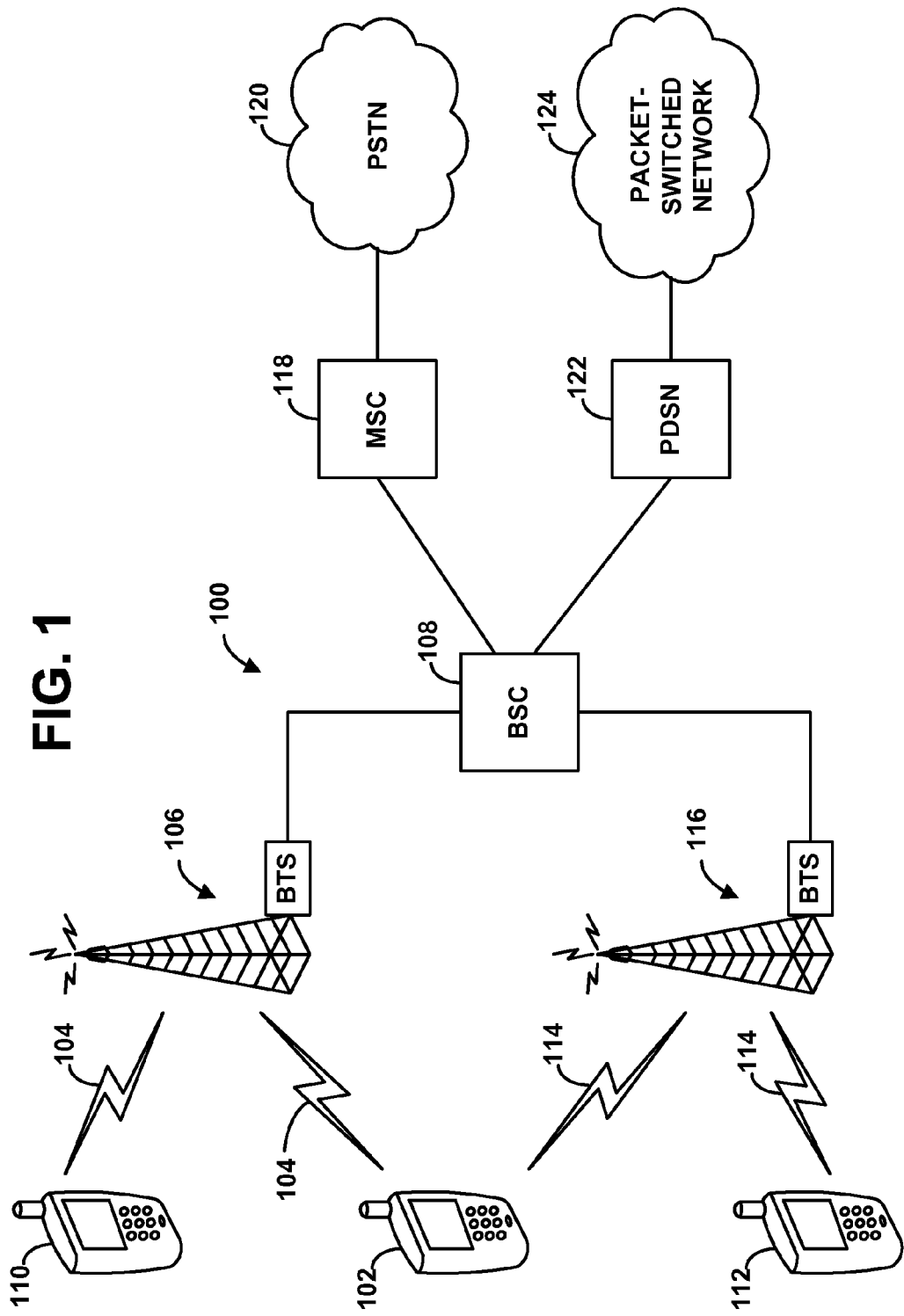
FIG. 1 is a block diagram of a wireless communication system in which an exemplary embodiment of the method can be implemented.

Referring to the drawings, FIG. 1 is a diagram illustrating a RAN as wireless communication system 100 in which an exemplary embodiment may be implemented. System 100 includes a BTS 106, which communicates with a plurality of WCDs 102, 110 over radio air interface 104. The air interface 104 represents a wireless coverage area, such as a cell sector, for example. System 100 also includes a BTS 116, which communicates with a plurality of WCDs 102, 112 over radio air interface 114, where the wireless coverage area represented by air interface 114 overlaps to some extent with the wireless coverage area of air interface 104. Though only two BTS stations are shown as an example, system 100 may contain more than two BTS stations.

WCDs 102, 110, 112 may be cellular phones, wireless personal digital assistants, wireless enabled computers or any other devices capable of wireless communication in system 100. Although only three WCDs are shown, system 100 can serve more or less than three WCDs, and each BTS 106, 116 may serve more or less than two WCDs. For the sake of convenience, and unless specified otherwise, it may be assumed that any reference below to a WCD refers to WCD 102.

Each BTS 106, 116 may be coupled with one or more base station controllers, such as BSC 108, which may control air interface communication and which may be coupled in turn with one or more switches or gateways that provide connectivity with one or more transport networks. By way of example, BSC 108 may be connected with one or more mobile switching centers, such as mobile switching center (MSC) 110, that provide connectivity with the public switched telephone network (PSTN) 112. Further, BSC 108 may be connected with one or more packet data serving nodes, such as packet data serving node (PDSN) 114, that provide connectivity with a packet-switched network 116 such as the Internet and/or a wireless carrier's core packet network. With this arrangement, each WCD 102, 110, 112 may be able to engage in communications on the PSTN 112 and/or on the packet-switched network 116 in a manner well known to those skilled in the art.

Figure 2:
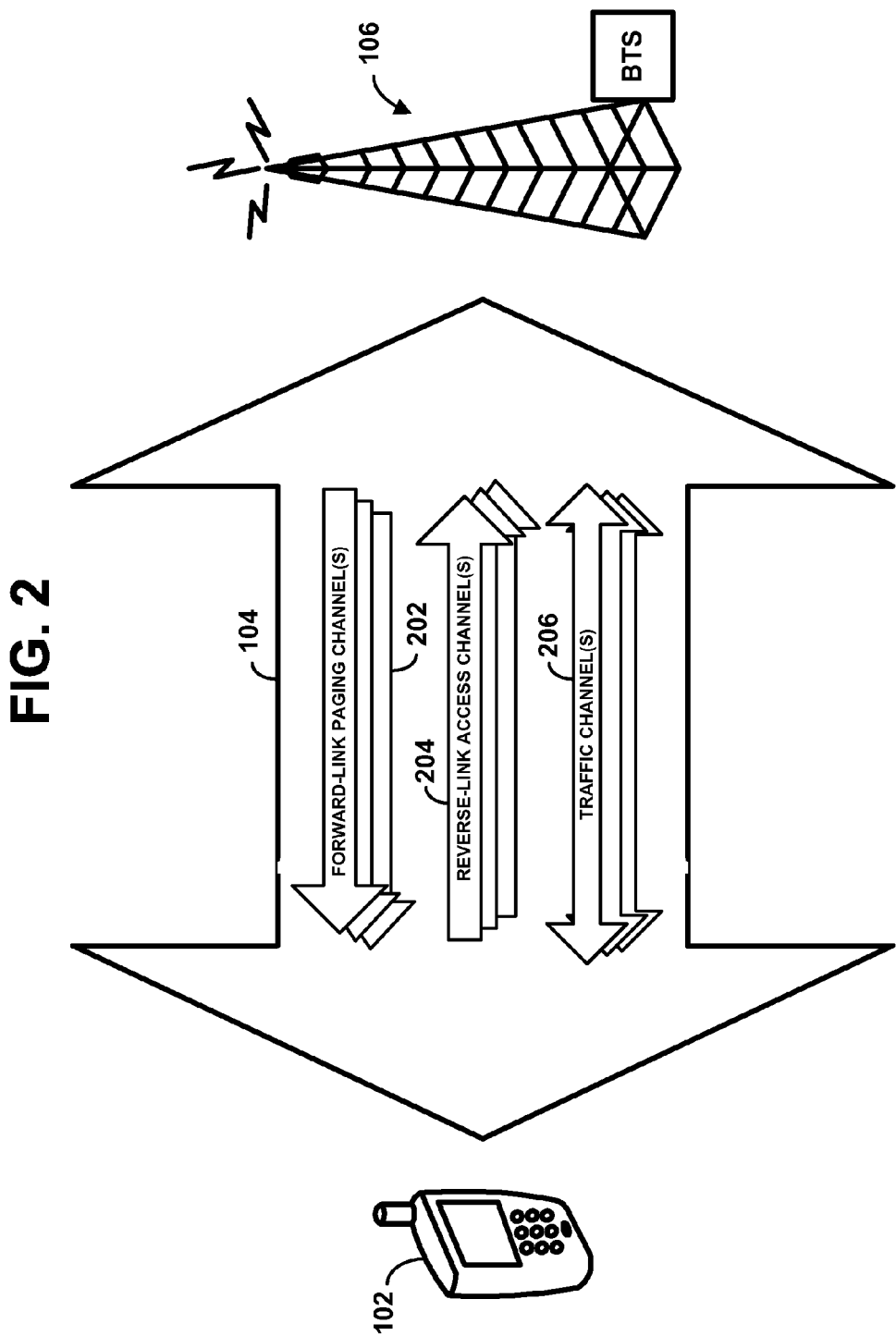
FIG. 2 is a block diagram illustration of a portion of an air interface in the arrangement of FIG. 1.

FIG. 2 is a diagram illustrating a portion of system 100, with an air interface depicted in more detail. Air interface 104 is chosen for illustrative purposes only and the following description may apply to air interface 114 as well. As shown by way of example in FIG. 2, air interface 104 may include multiple channels, such as at least one forward-link paging channel 202, at least one reverse-link access channel 204, and at least one traffic channel 206.

Each forward-link paging channel 202 may carry from BTS 106 to one or more WCDs, such as WCDs 102, 110, messages such as page messages, access parameter messages, and/or other control messages well known in the art. Each reverse-link access channel 204 may carry messages such as access probes and other control messages well known in the art from one or more WCDs, such as WCDs 102, 110, to BTS 106.

Each traffic channel 206 may operate to carry voice and/or data communications between the BTS 106 and a WCD operating within the wireless coverage area of air interface 104, such as WCD 102. Typically, there are multiple traffic channels 206 serving the WCDs within a given air interface and each individual traffic channel is assigned exclusively to a given WCD. For example, a first traffic channel 206 may be assigned to WCD 102 and a second traffic channel 206 may be assigned to WCD 110.

Channels 202, 204, and 206 may be defined in a manner well known in the art for various transmission schemes. For example, in a CDMA system, channels may be encoded and modulated according to Walsh codes. As another example, in an Evolution-Data Optimized (alternatively, Evolution-Data Only) (EVDO) system, other multiplexing techniques such as TDMA might be utilized alone, in combination, or in addition to CDMA to define the channels. Under other wireless communication systems and protocols, the channels may be defined in other ways and may have other names.

Figure 3:
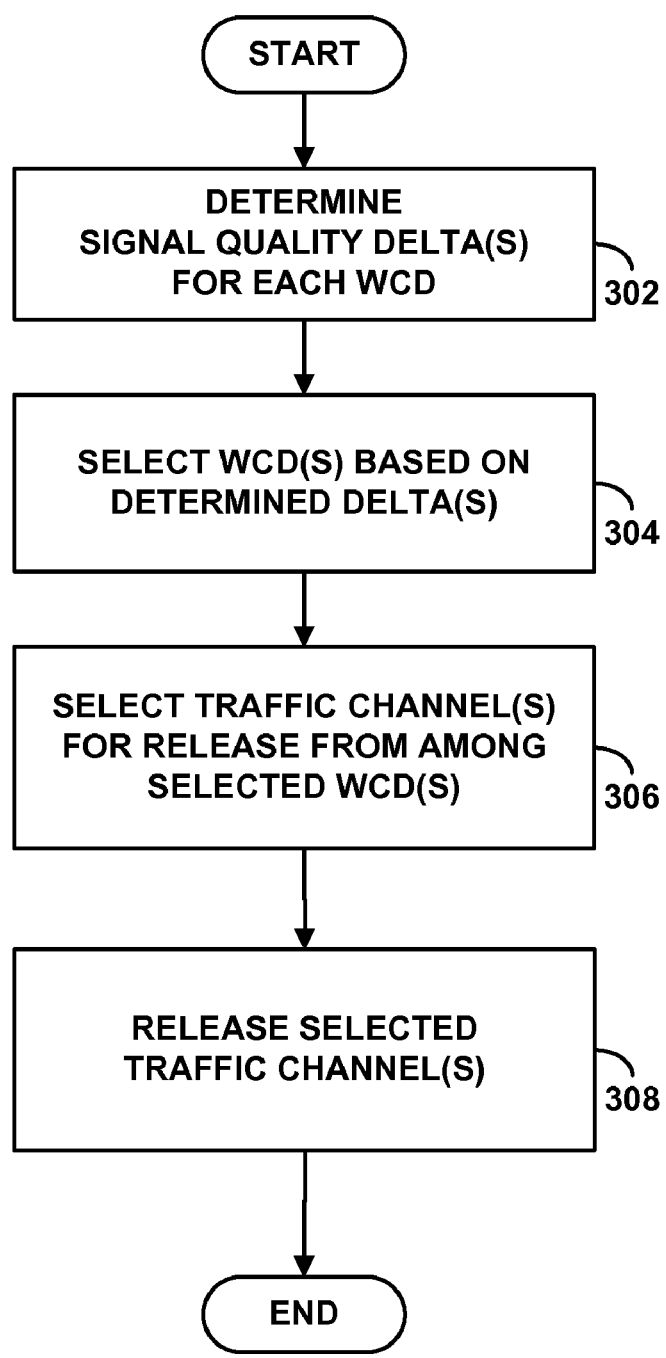
FIG. 3 is a flow chart depicting functions carried out in accordance with an exemplary embodiment.

FIG. 3 is a flow chart depicting functions carried out in accordance with an exemplary embodiment. At block 302, at least one signal quality delta is determined for each WCD within a group of WCDs. The signal quality delta is defined generally as the difference between two signal qualities related to a WCD's communication with a BTS. For example, a first signal quality may be defined as the signal quality of a single traffic channel on which the WCD communicates with the BTS. A second signal quality may be defined as the overall signal quality a WCD experiences when it communicates over multiple traffic channels with one or more BTS stations. Because of the nature of channel-based radio-frequency communications, the use of multiple (or "pooled") communication channels by a single WCD can increase the communication quality experienced by that WCD. The mathematical basis for this is explained in further detail below, in reference to Table I.

Signal quality may be defined in a number of ways, including, by way of example, as signal-to-noise ratio or pilot energy versus total spectral energy. As another example, in a CDMA system, a channel's signal quality value may be defined as the channel's energy per bits versus the total received power spectral density, commonly known in the art as the "$E_c/I_o$" value.

$E_c/I_o$ values for RF communication systems are typically expressed in terms of decibels (dB). Typical values for a CDMA communication systems range from 0 dB to −17 dB, where 0 dB is the highest quality signal, corresponding to no measurable spectral energy beyond the communication signal between the WCD and the BTS. Conversely, an $E_c/I_o$ value of −17 dB represents a poor signal quality due to significant RF noise in the signal path between the WCD and the BTS.

As an illustrative example, Table I below lists $E_c/I_o$ values for each traffic channel 206 assigned to each of four example WCDs. The four WCDs are labeled "A," "B," "C," and "D," and may be any or each of WCD 102, 110, and/or 112. The traffic channels are labeled numerically and sequentially for descriptive purposes only. The resulting Aggregate $E_c/I_o$ values and signal quality deltas are shown in their respective columns.

TABLE I

| WCD | Assigned Traffic Channel | Channel $E_c/I_o$ | Aggregate $E_c/I_o$ (All Channels) | Signal Quality Delta |
|---|---|---|---|---|
| A | 1 | −5 dB | −1.4 dB | −3.6 |
|   | 2 | −6 dB |  | −4.6 |
|   | 3 | −9 dB |  | −7.6 |
|   | 4 | −15 dB |  | −13.6 |
| B | 5 | −4 dB | −1.8 dB | −2.2 |
|   | 6 | −7 dB |  | −5.2 |
|   | 7 | −15 dB |  | −13.2 |
|   | 8 | −16 dB |  | −14.2 |
| C | 9 | −15 dB | −9.0 dB | −6.0 |
|   | 10 | −15 dB |  | −6.0 |
|   | 11 | −15 dB |  | −6.0 |
|   | 12 | −15 dB |  | −6.0 |
| D | 13 | −5 dB | −3.8 dB | −1.2 |
|   | 14 | −10 dB |  | −6.2 |

An aggregate signal quality may be determined as the combined signal qualities of all communication channels for a given WCD. When signal qualities are expressed in terms of decibels, such as for $E_c/I_o$ values, the aggregate signal quality can be mathematically calculated through decibel (i.e., logarithmic) addition. In Table I, the Aggregate $E_c/I_o$ value for a given WCD may be calculated by logarithmically summing the $E_c/I_o$ values for each traffic channel assigned to the WCD. The general equation for decibel addition, as it relates to $E_c/I_o$ values, is:

$$\text{Aggregate } E_c/I_0 = 10*\log\left(10^{\frac{(E_c/I_0)_1}{10}} + 10^{\frac{(E_c/I_0)_2}{10}} + \ldots + 10^{\frac{(E_c/I_0)_n}{10}}\right)$$

where "$(E_c/I_o)_n$" corresponds to the $E_c/I_o$ value of a each channel. For the WCD labeled as "A" in Table I, the Aggregate $E_c/I_o$ value is calculated as follows:

$$WCD_A \text{ Aggregate } E_c/I_0 =$$
$$10*\log\left(10^{\frac{-5}{10}} + 10^{\frac{-6}{10}} + 10^{\frac{-9}{10}} + 10^{\frac{-15}{10}}\right) = -1.4 \text{ dB}$$

Once the aggregate signal quality for a WCD is determined, a signal quality delta for one or more channels of the WCD may be determined. The signal quality delta for a traffic channel assigned to a WCD is calculated as the simple difference between the $E_c/I_o$ of the traffic channel and the Aggregate $E_c/I_o$ of the WCD. For example, for the WCD labeled as "A" in Table I, the traffic channel labeled as "1" has a signal quality delta calculated as:

Signal Quality Delta of Traffic Channel 1=(−5 dB)−(−1.4 dB)=−3.6

The values listed in Table I are meant for illustrative purposes only and may not represent real values. For example, there may be more or less than four WCDs in the communication system 100, and each WCD may have various quantities of assigned traffic channels. Further, the signal quality may be a measure other than the $E_c/I_o$ value. Additionally, the aggregate signal quality may be a measure other than the Aggregate $E_c/I_o$ and may be calculated by a method other than logarithmic addition of the signal quality values.

At least one signal quality delta may be determined for each WCD. For example, the signal quality delta may be determined for the channel with the poorest signal quality on each WCD. In the event that multiple channels of a single WCD possess the same signal quality, and it is the poorest signal quality of all the channels of the WCD, then any of the multiple channels may be selected. As an example, for Table I above, a signal quality delta for channels 4, 8, 14 and any one of channels 9 through 12, may be determined. Alternatively or additionally, multiple signal quality deltas may be determined for each WCD. For example, the signal quality delta for each traffic channel of each WCD may be determined.

The signal quality delta may be determined by each WCD 102, 110, and 112, at the BTS 106 or 116 with which the WCD communicates, at the BSC 108, or at the MSC 110. Additionally, the determined signal quality delta may be transmitted from the determining entity to any other entity in system 100.

The group of WCDs for which signal quality delta is determined may be defined in various manners. For example, the group may include all WCDs communicating with an air interface, such as WCDs 102, 110 on air interface 104. As another example, the group may include all WCDs communicating with air interfaces controlled by, or in a communication path with, one or more BSCs, such as WCDS 102, 110, 112 on air interfaces 104, 114 and in a communication path with BSC 108. As another example, the group may include all WCDs in a RAN.

At block 304 of the method illustrated in FIG. 3, after determining the signal quality deltas for each WCD within a group, one or more of the WCDs may be selected, with the intent that each selected WCD(s) may have one or more of its traffic channels removed. The BTS stations 106 and/or 116, the BSC 108, or the MSC 110 may perform the WCD selection step.

When selecting WCDs, it is generally preferred that those WCD's with the largest magnitude signal quality deltas be selected (i.e., those with the largest absolute value are selected). Typically, a large signal quality delta indicates that the corresponding channel contributes only minimally to the aggregate signal quality of a WCD. Because call quality is typically a function of the number of traffic channels assigned to a WCD and the signal quality of those traffic channels, a WCD with both small and large magnitude signal quality deltas may be able to give up one or more of its lower quality traffic channels (higher magnitude signal quality deltas) and still maintain a desired level of call quality.

TABLE II

| WCD | Assigned Traffic Channel | Channel $E_c/I_o$ | Aggregate $E_c/I_o$ (All Channels) | Signal Quality Delta |
|---|---|---|---|---|
| B | 5 | −4 dB | −1.8 dB | −2.2 |
|   | 6 | −7 dB |  | −5.2 |
|   | 7 | −15 dB |  | −13.2 |
|   | 8 | −16 dB |  | −14.2 |
| B* | 5 | −4 dB | −2.0 dB | −2.0 |
|   | 6 | −7 dB |  | −5.0 |
|   | 7 | −15 dB |  | −13.0 |
| C | 9 | −15 dB | −9.0 dB | −6.0 |
|   | 10 | −15 dB |  | −6.0 |
|   | 11 | −15 dB |  | −6.0 |
|   | 12 | −15 dB |  | −6.0 |
| C* | 9 | −15 dB | −10.2 dB | −4.8 |
|   | 10 | −15 dB |  | −4.8 |
|   | 11 | −15 dB |  | −4.8 |

Table II shows WCD "B" and WCD" C" from Table I. WCD "B" has four channels with signal quality deltas ranging from small to large, with values from −2.2 to −14.2. WCD "C" also has four channels, but the signal quality deltas are all identical at −6.0. The WCDs labeled as "B*" and "C*" show the effect of removing a single channel from each of WCDs "B" and "C." Removing the channel with the largest signal quality delta, channel 8 of WCD "B," results in a change in the Aggregate $E_c/I_o$ from −1.8 dB to −2.0 dB, a change that may be insignificant in terms of call quality. Conversely, removing a channel from WCD "C" results in a decrease in the aggregate $E_c/I_o$ from −9.0 dB to −10.2 dB, a much more significant change than that experienced by WCD "B."

One example of selecting one or more WCDs comprises selecting each WCD with the largest magnitude signal quality delta among the unselected WCDs. For example, in Table I, WCD "B" with a signal delta of −14.2 would be selected first. If another WCD is to be selected, WCD "A" with a signal quality delta of −13.6 would be selected next.

As another example of selecting one or more WCDs, each WCD with some minimum threshold difference between its largest and smallest signal quality delta may be selected. This may ensure each selected WCD may have traffic channels that contribute only minimally to its overall signal quality, and thus each selected WCD may be able to give up those traffic channels without significantly effecting its call quality. To illustrate with respect to the Table I above, if the minimum threshold difference between signal quality deltas is set at −6.0, only WCDs "A" and "B" would be selected, since they are the only WCD with at least two signal quality deltas with a difference in magnitude greater than −6.0. The difference between the signal quality deltas of channel 1 and channel 4 is −13.6−(−3.6)=−10.0; and, the difference between the signal quality deltas of channel 5 and channel 8 is −14.2−(−2.2)=−12.0.

As another example, a specific quantity ($Q_{WCD}$) of the WCDs may be selected. For example, for $Q_{WCD}$=3, the three WCDs with the greatest signal magnitude signal quality deltas may be selected. For Table I, that would include WCDs "A," "B," and "D," with maximum signal quality deltas of −13.6, −14.2, and −6.2 respectively.

Additionally, the selection of WCDs may be limited by individual signal quality values. For example, a WCD may not be selected if all of its $E_c/I_o$ values are greater in magnitude than a threshold value. This can help ensure that the WCD maintains at least a minimum level of call quality. For example, in Table I, if the threshold $E_c/I_o$ value is set to −9 dB, the WCD identified as "C" might not be selected because it may not have sufficiently high $E_c/I_o$ values on any single traffic channel; rather, WCD "C' may be maintaining call quality through an Aggregate $E_c/I_o$ value that is comprised of numerous low quality channels.

At block 306, after selecting one or more WCDs based on their determined deltas, one or more traffic channels may be selected for removal from among each of the selected WCDs. The BTS 106, the BSC 108, or the MSC 118 may perform the traffic channel selection step. Selecting traffic channels for removal may be accomplished according to an algorithm that distributes the loss of call quality (e.g., the loss of available traffic channels 206) across the selected WCDs in some manner.

As an example, if at least one channel is to be selected for removal from each WCD, then the channel with the lowest signal quality on each WCD may be selected. In this example, using Table I, if WCDs "A," "B," "C," and "D" were each selected in step 304, then traffic channels 4, 8, 14, and one of 9 through 12 may each be selected for removal.

Alternatively or additionally, channels may be selected for removal based upon their influence upon the aggregate signal quality of the selected WCDs. Table III shows an example.

TABLE III

| WCD | Assigned Traffic Channel | Channel $E_c/I_o$ | Aggregate $E_c/I_o$ (All Channels) | Signal Quality Delta | New Aggregate $E_c/I_o$ (Channel Removed) |
|-----|---|---|---|---|---|
| A | 1 | −5 dB | −1.4 dB | −3.6 | −3.9 dB |
|   | 2 | −6 dB |   | −4.6 | −3.2 dB |
|   | 3 | −9 dB |   | −7.6 | −2.2 dB |
|   | 4 | −15 dB |   | −13.6 | −1.6 dB |
| B | 5 | −4 dB | −1.8 dB | −2.2 | −5.9 dB |
|   | 6 | −7 dB |   | −5.2 | −3.4 dB |
|   | 7 | −15 dB |   | −13.2 | −2.1 dB |
|   | 8 | −16 dB |   | −14.2 | −2.0 dB |
| C | 9 | −15 dB | −9.0 dB | −6.0 | −10.2 dB |
|   | 10 | −15 dB |   | −6.0 | −10.2 dB |
|   | 11 | −15 dB |   | −6.0 | −10.2 dB |
|   | 12 | −15 dB |   | −6.0 | −10.2 dB |
| D | 13 | −5 dB | −3.8 dB | −1.2 | −10.0 dB |
|   | 14 | −10 dB |   | −6.2 | −5.0 dB |

In this example, if WCDs "A," "B," "C," and "D" were each selected in step 304, then traffic channel 4 would be selected first for removal because removing any other traffic channel from WCD "A" or from any other WCD would not result in the lowest new Aggregate $E_c/I_o$. Specifically, if channel 4 is removed from WCD "A," the resulting new Aggregate $E_c/I_o$ for WCD "A" would be −1.6 dB, which is lower than the −2.0 dB, −10.2 dB, and −5.0 dB new Aggregate $E_c/I_o$ values for WCDs "B," "C," "D" respectively, if their lowest quality signal channel was removed. The selection of each successive traffic channel may be based either on the new Aggregate $E_c/I_o$ values as shown currently in Table III, or on successive iterations of re-calculated new Aggregate $E_c/I_o$ values based on the remaining unselected traffic channels (not shown).

As yet another example, for each selected WCD, any assigned traffic channel with a signal quality delta having a magnitude greater than a minimum threshold value may be selected for removal. With respect to the Table I above, for instance, if WCDs "A," "B," "C," and "D" were each selected in step 304, and the minimum signal quality delta threshold value is set to −7 dB, then traffic channels 3, 4, 7, and 8 might be selected for removal from their respective WCDs 102. Other variations are possible as well, and these examples are not meant to limit the algorithms by which channels may be selected for removal. The foregoing examples may be used in conjunction with each other or with other algorithms.

Additionally or alternatively, the selection of traffic channels for removal may be limited by the distribution of the signal quality values for a given WCD. For example, no traffic channel may be selected if none of traffic channels for the given WCD have an absolute $E_c/I_o$ value lower than a threshold value. This may help ensure that each WCD has at least one traffic channel with sufficient signal quality to maintain a desired level of call quality. This threshold value may be the same or different than the example threshold value discussed above in relation to selection of WCDs. For example, in Table I above, if the threshold $E_c/I_o$ value is set to −10 dB, no traffic channels may be selected for removal from WCD "C" because it does not have sufficiently small absolute $E_c/I_o$ values on any traffic channel.

Additionally or alternatively, the selection of traffic channels may be limited by the remaining quantity of traffic channels for a given WCD. This may help ensure that each WCD has at least a minimum number of traffic channels to maintain a desired level of call quality. For example, one or more traffic channels assigned to a given WCD may not be selected if their release would cause the total number of traffic channels assigned to the WCD to fall below a threshold value. For example, in Table I above, if the threshold value is set to a minimum of two traffic channels assigned to each WCD 102, and the channel selection algorithm results in three channels being selected for removal from the WCD identified as "B," then only two channels would actually be removed because a minimum of two channels must remain assigned to "B."

At block 308, at least one selected traffic channel, and preferably all selected traffic channels, may be released. Just as the BTS 106 or another network entity may assign one or more traffic channels 206 exclusively for use by a given WCD 102 within an air interface 104, the BTS 106 or another network entity may remove the traffic channel 206 from the WCD 102 by taking away the exclusive assignment of the traffic channel 206 to the WCD 102, thus freeing the traffic channel 206 for assignment to, and use by, other WCDs operating within the air interface 104. For instance, the BTS 106 may exclusively assign a traffic channel 206 to a WCD 102 by establishing a hardware connection within the communication path to the WCD 102, and the BTS may remove a traffic channel 206 by breaking the hardware connection. Consequently, the BTS removes the exclusive assignment of the given traffic channel 206 to the selected WCD 102. As an example, the BTS 106 (or the BSC 108, the MSC 118, or another network entity) may send an Extended Handoff directive to the WCD 102. The WCD 102 may signal responsively and then the BTS 106 (or the BSC 108, the MSC 118, or another network entity) may shut down the physical channel element carrying the radio traffic and stop transmitting on the channel.

In another embodiment, it may be desirable to determine a quantity of traffic channels 206 to release, where the determination is based upon a measured level of network resource utilization. The measured level of utilization may be instantaneous, time-averaged, current, historical, predicted, or any other appropriate metric. One useful indicator of network resource utilization is channel occupancy. In simplified terms, channel occupancy is a measure of how much data a channel is carrying in relation to the maximum amount of data it can actually carry.

To appreciate how network resource utilization may be used to help determine a quantity of channels to release, access channel occupancy within a CDMA system may be used as an illustrative example. It should be noted, however, that a CDMA system example is not meant to be a limitation. Rather, the matters discussed below are relevant to other measures of network resource utilization in other wireless transmission schemes, including but not limited to traffic or administrative channel occupancy in EVDO, TDMA, FDMA, WiMAX, or other network types.

Within a CDMA system, access channels 204 may be used to carry access probes from a WCD 102 to a BTS 106 in order to register the WCD 102 with the BTS 106. If all else remains constant and the number of access probes from one or more WCDs increases, the access channel occupancy increases. Commensurately, as access channel occupancy grows, a BTS's 106 ability to serve new or existing calls in a given sector is restricted due to the access channel's 204 diminished ability to carry additional data for WCD registration or re-registration. Access channel occupancy may typically be calculated at the BTS 106 or the BSC 108, although it may be determined at another network device and the determined access channel occupancy may be sent to any other network device.

Each access channel 204 may be divided into discrete time slots, where each time slot is theoretically capable of successfully carrying a single access probe. Normally, an access probe from a WCD 102 travels in an access channel 204 time slot to the BTS 106 and an acknowledgement of each successful access probe travels in a paging channel 202 timeslot from the BTS 106 back to the WCD 102.

The tables in FIG. 4 show two access channels 402, 404 of a given air interface 104. For exemplary purposes only, access channels 402, 404 may be considered the only access channels of the given air interface 104. Each access channel 402, 404 is shown with five consecutive timeslots, designated TS1 through TS5, where the five timeslots are exemplary representations of a portion of continuous timeslots within an access channel. For purposes of this exemplary system, the ten combined time slots in FIG. 4 may be considered the only access channel time slots for the given air interface 104 for a given time period. Consequently, the tables in FIG. 4 may also illustratively represent all the timeslots of all the access channels 204 for a particular sector in a wireless communications system 100 for a given time period.

FIG. 4 depicts nine example access probes, designated AP1 through AP9, shown in various time slots. Each timeslot is considered occupied if it is carrying a single access probe, such as AP1 in TS1, or if it is carrying multiple colliding access probes, such as AP4 and AP5 in TS2. Colliding access probes can occur when two or more access probes are transmitted by separate WCDs on the same access channel at the same time, typically resulting in an error receiving the individual access probes; however, that is inconsequential for this example, as it is only relevant whether the timeslot is occupied or not occupied. Thus for the access channels 402 and 404 shown in FIG. 4, timeslots TS1, TS2, TS4, and TS5 of access channel 402 are occupied and timeslots TS2, TS3, and TS5 of access channel 404 are occupied. Consequently, seven of the ten total access channel timeslots in the air interface 104 are occupied and the access channel occupancy is therefore 70% (i.e., 7÷10=70%) for the given time period. Stated another way, the access channel occupancy network resource may be considered 70% utilized.

Another useful indicator of network resource utilization is network load level. Network load level can be calculated in a number of ways. For example, total network load level may be calculated as the percentage of used bandwidth to total bandwidth within all channels available to a given air interface 104. More preferably, the network load level may be calculated as a network traffic load level, where the network traffic load level is the percentage of used traffic channels to the number of total traffic channels within an air interface 104. For an exemplary CDMA system, it may be assumed that there are 64 Walsh Codes defining 64 total channels within air interface 104. In such a system, if one Walsh Code is used for each of a pilot signal, a sync signal, a paging channel 202, and two access channels 402 and 404, then there are 59 remaining channels available to be used for traffic channels 206. If 50 of those 59 traffic channels 206 are in use (i.e., assigned to WCDs), then the network load level would be 50 divided by 59, or approximately 85%. Alternatively, the network load level can be defined as the total number of Walsh codes used out of the total number of Walsh codes available with air interface 104.

Alternatively or additionally, network traffic load level may be determined in other ways as well. For example, traffic channels 206 may be divided into discrete time slots in much the same manner as the access channels 204 described above. In such a system, network traffic load level can be calculated as a percentage of occupied traffic channel 204 time slots versus total traffic channel time slots for a given time period.

Alternatively or additionally, network load level may be calculated as percentage of total power used in an air interface 104. For example, an air interface 104 may have a finite limit of 20 watts of transmitting power. If 18 watts are currently utilized for transmitting on various channels, the network load level may be considered 90% utilized. Network load level, or any variation thereof, may typically be determined at the BTS 106 or the BSC 108, although it may be determined at another network device and then may be sent to any other network device.

FIG. 5 illustrates an exemplary method in which one or more measures of network resource utilization within a network may be used to determine a quantity of traffic channels 206 to release from selected WCDs 102, and optionally, for triggering execution of method step 302. At method step 502, the access channel occupancy of one or more air interfaces may be determined according to the examples described above, or other methods commonly known in the art. At step 504, the network load level may be determined according to one or more of the examples described above, or other methods commonly known in the art. A network entity, such as the BTS 106 or 116, or the BSC 108, may regularly or continuously monitor and/or determine the access channel occupancy and the network load level or the network entity may monitor and/or determine such resource utilization only in response to a directive command.

At step 506, a method step may occur for triggering step 302. Alternatively, step 302 may instead start and proceed on its own accord, without influence or input from steps 502, 504, 506, and 508. Method step 506 is further discussed in detail below.

Each of the method steps 502, 504, and 508 may be executed before, during, or after any of the method steps 302, 304, and 306 in FIG. 5. Further, the method steps 502 and 504 may be executed in any order with respect to each other, including simultaneously. Additionally, the method steps 506 and 508 may be executed in any order with respect to each other, including simultaneously.

At step 508, a quantity $Q_{TC}$ of traffic channels 206 to release may be determined. A network entity, such as BTS 106, BSC 108, MSC 118, or another network entity, may determine the quantity $Q_{TC}$. The quantity $Q_{TC}$ may be determined based, for example, on the access channel occupancy, the network load level, the network traffic load level, another measure of network resource utilization, or any combination of these or other network utilization metrics. Because higher access channel occupancy represents a greater need for available resources to serve new calls and because a greater network load represents potentially insufficient resources to serve new calls, a network entity such as BTS 106 or BSC 108 will preferably remove more traffic channels 206 from exclusive assignment as the channel occupancy grows and/or as the network load grows.

To carry this out in practice, a network entity such as BTS 106 or BSC 108 may maintain a table that defines one or more network utilization trigger levels, each involving one or more threshold channel occupancy values and one or more threshold network load values. Each trigger level may specify a number $Q_{WCD}$ of WCDs from which the network entity should remove one or more traffic channels 206.

Alternatively or additionally, each trigger level may specify one or more threshold signal quality deltas for use in selecting the WCDs, in accordance with the selection steps described with respect to steps 302 and 304. The $Q_{WCD}$ value may also be correlated with threshold signal quality values.

As an example, if conditions are not very critical (e.g., high network load but low access channel occupancy), the table may indicate that the network entity should remove a single traffic channel 206 from each of up to a given number of WCDs having only large magnitude signal quality deltas. If conditions are a bit more critical (e.g., high network load and somewhat high access channel occupancy), the table may indicate that the network entity should remove a traffic channel 206 from each of up to a greater number of WCDs, and/or from WCDs having a somewhat lower magnitude delta than would be used if the conditions were not very critical. If conditions are very critical (e.g., high network load and high access channel occupancy), the table may indicate that the network entity should remove a traffic channel 206 from each of up to an even greater number of WCDs and/or from WCDs having down to a still lower reported delta.

The network table, or another network table, may include indications regarding the number $Q_{TC}$ of traffic channels 206 that should be removed. Those indications may relate to the reported signal quality deltas and the criticality of network conditions. The network entity may regularly consider the access channel occupancy and the network load and may also refer to the network table to determine the number of traffic channels 206 to remove. The network entity may also refer to signal quality data reported by the WCDs to identify those WCDs from which to remove traffic channels 206.

Table IV shows an exemplary network table for indicating a quantity $Q_{TC}$ of traffic channels 206 to release from WCDs operating within an air interface 104 that utilizes 64 Walsh Codes to define 64 total channels. Table IV discloses threshold values for a combination of network traffic load levels and access channel occupancies of the air interface 104.

TABLE IV

| Network Traffic Load Level | Access Channel Occupancy | $Q_{TC}$ (traffic channels to be removed) |
|---|---|---|
| 75% | 25% | 10 |
| 70% | 25% | 7 |
| 80% | 20% | 8 |

According to Table IV above, if the network traffic load level exceeds 75% and the access channel occupancy exceeds 25%, a total of 10 traffic channels 206 would be selected for removal from selected WCDs within air interface 104. Similarly, exceeding 70% load level and 25% access channel occupancy would result in seven traffic channels 206 being selected for removal. Exceeding 80% load level and 20% access channel occupancy would result in eight traffic channels 206 being selected for removal. $Q_{WCD}$ values may also be listed in this or a different table.

As noted above, method step 506 may trigger execution of method step 302. As an example, if the signal quality determination of step 302 occurs at the WCD 102, or the signal quality is reported by the WCD 102, then step 302 may be triggered, for example, by means of a data bit sent in an overhead message. For example, the BTS 106 could set a message bit in an administrative message, such as an in-traffic channel message, where the message bit serves to direct the WCDs to begin reporting their signal qualities, or the results of their signal quality delta determinations.

Preferably, step 506 would trigger step 302 whenever any of the conditions normally determined at step 508 would result in $Q_{TC}>0$. For example, with reference to the exemplary Table IV above, if both the conditions in any row of Table IV are satisfied, the method step 302 may be triggered (e.g., method step 302 may be triggered if the network traffic load level exceeds 75% and the access channel occupancy exceeds 25%). Alternatively, other parameters may be used to invoke the trigger of step 506. For example, the trigger may be invoked whenever the access channel occupancy, the network load level, the network traffic load level, any other measure of network resource utilization, or any combination of these or other network utilization metrics exceeds a given threshold.

Alternatively, steps 302, 304, and 306 may cycle continuously or both steps 302 and 502 may be started by the same, or substantially the same, means. For example, steps 302 and 502 may be started by one or more administrative messages or directives from a network entity such as the BTS 106, the BSC 108, or the MSC 118.

At step 510, at least one selected traffic channels may be released, as described in accordance with step 308.

FIG. 6 is a block diagram illustrating exemplary components of a network entity 600. The network entity 600 may be any entity within a wireless communication system, such as system 100. For example, the network entity 600 may be a BTS 106, a BSC 108, or an MSC 118, or the network entity may be part of a BTS 106, a BSC 108, or an MSC 118. Alternatively, the network entity 600 may be some other network entity capable of receiving information about, or determining, network resource utilization and removing or directing other network entities to remove traffic channels from a WCD 102. The network entity 600 may include a network communication interface 602, a processor (i.e., one or more processors) 604, and data storage 606, all of which are communicatively coupled through a system bus 608. Other arrangements are possible as well.

The network communication interface 602 may include a chipset for performing network communications. Performing network communications may include transmitting and/or receiving data using a wireless connection or using a fixed, physical connection, such as metal wire or fiber optic cable. The chipset for performing wireline communications may be mounted on a network interface card (NIC). An exemplary NIC with a chipset for performing wireline communications according to the Institute of Electrical and Electronics Engineers (IEEE) 802.3® standard for Carrier Sense Multiple Access with Collision Detection (CSMA/CD) Access Method is the SP2610R Gigabit Ethernet Adapter NIC manufactured by the Spectrum Technologies Corporation of Taipei Hsien, Taiwan, Republic of China. Other examples of NICs with a chipset for performing wireline communications and other examples of wireline communication standards are also possible.

The network communication interface 602 may transmit various types of data to the WCDs and/or receive various types of data from the WCDs. Additionally, the network communication interface 603 may communicate with other network entities.

The data storage 606 may comprise one or more volatile and/or nonvolatile storage components such as magnetic, optical, or organic storage and may store various types of data. The data storage 606 may store program logic 610 (e.g., program instructions) executable by the processor 604. The program logic 610 may contain instructions executable by the processor 604 to provide services such as determining or receiving information about network resource utilization, signal quality values, signal quality deltas, and aggregate signal quality deltas, selecting WCDs, selecting traffic channels 206 for release, releasing, or directing other network entities to release, selected traffic channels, and looking up information (e.g., threshold values or network utilization) in data storage 606.

The foregoing example of program logic 610 instructions is intended to be exemplary only. For example, the processor 604 may use instructions contained in the program logic 610 to accomplish each of the method steps described with respect to FIGS. 3 and 5. Further, it should be understood the program instructions stored in the data storage 606 are executable by the processor 604 to carry out any of the network-related functions described herein.

In a preferred embodiment, the network entity 600 may be the BSC 108, or part of the BSC 108. As the BSC 108 or part of the BSC 108, the network entity 600 could readily determine network resource utilization such as network traffic load level and access channel occupancy. Further, as the BSC or part of the BSC 108, the network entity 600 could easily release selected traffic channels 206 from the selected WCDs 102 by means of an Extended Handoff directive, as previously described with respect to step 308, or other means commonly known in the art.

The methods and systems described herein are beneficial for at least the following reason: the embodiments described herein allow more efficient use and/or distribution of network resources by releasing from use those network resources that are least likely to effect call quality. Additionally, the methods provide an effective method for efficiently selecting WCDs from which to remove communication channels. Exemplary embodiments have been shown and described herein. Those of ordinary skill in the art will appreciate that numerous modifications from the embodiments described are possible, while remaining within the scope of the claims.

We claim:

1. In a wireless communication system in which a radio access network (RAN) serves a plurality of wireless communication devices (WCDs), wherein each WCD has a plurality of assigned air interface traffic channels on which the WCD communicates with the RAN, wherein each air interface traffic channel defines a channel signal quality, wherein the signal quality is an $E_c/I_o$ value, and wherein each air interface traffic channel consumes network resources, a method of selectively releasing network resources, the method comprising:

for each WCD, determining at least a delta between (i) the signal quality of one of the WCD's assigned air interface traffic channels and (ii) aggregate signal quality of the WCD's assigned air interface traffic channels;

selecting one or more of the WCDs based on the determined deltas of the WCDs;

for each selected WCD, selecting at least one, but less than all, of the WCD's assigned air interface traffic channels to release; and for each selected WCD, releasing each selected air interface traffic channel, thereby making network resources associated with the released air interface traffic channel available for other use.

2. The method of claim 1, further comprising:

determining access channel occupancy within the radio access network;

determining a network load level within the radio access network;

determining a quantity of air interface traffic channels to release based upon the determined access channel occupancy and the determined network load level; and releasing in aggregate the determined quantity of air interface traffic channels from among the selected air interface traffic channels of the selected WCDs.

3. The method of claim 1, wherein selecting at least one, but less than all, of the WCD's air interface traffic channels to release further comprises selecting none of the WCD's air interface traffic channels if the signal quality of each of the WCD's air interface traffic channels is below a minimum threshold signal quality.

4. The method of claim 1, wherein selecting one or more of the WCDs based on the determined deltas of the WCDs further comprises:

determining the signal quality of each of the WCDs' air interface traffic channels; and selecting one or more of the WCDs based on the determined deltas of the WCDs and based on the determined signal qualities of the WCDs' air interface traffic channels, wherein, for each selected WCD, the determined signal quality of at least one of the selected WCD's air interface traffic channels is greater than a minimum threshold signal quality.

5. The method of claim 1, wherein selecting at least one of the WCD's air interface traffic channels to release comprises:

determining the signal quality of each of the WCDs' air interface traffic channels; and selecting one or more of the WCDs' air interface traffic channels, wherein the selected air interface channels of each WCD have lower determined signal quality than the determined signal quality of each of the air interface traffic channels for the same WCD that are not selected.

6. The method of claim 1, wherein determining at least the delta between (i) the signal quality of one of the WCD's assigned air interface traffic channels and (ii) aggregate signal quality of the WCD's assigned air interface traffic channels comprises:

determining at least a delta between (i) the signal quality of the WCD's assigned air interface traffic channel with the lowest signal quality and (ii) aggregate signal quality of the WCD's assigned air interface traffic channels.

7. The method of claim 1, further comprising:

determining a delta between (i) the signal quality of each of the WCD's assigned air interface traffic channels and (ii) aggregate signal quality of the WCD's assigned air interface traffic channels.

8. The method of claim 7, wherein selecting at least one of the WCD's air interface traffic channels to release comprises:

selecting one or more of the WCDs' air interface traffic channels, wherein the selected air interface channels of each WCD have a greater determined delta than the determined delta of each of the air interface traffic channels for the same WCD that are not selected.

9. The method of claim 1, further comprising calculating the aggregate signal quality of the WCD's assigned air interface traffic channels as the logarithmic sum of the signal qualities of each of the WCD's assigned air interface traffic channels.

10. In a wireless communication system in which a radio access network (RAN) serves a plurality of wireless communication devices (WCDs), wherein each WCD has a plurality of assigned air interface traffic channels on which the WCD communicates with the RAN, wherein each air interface traffic channel defines a channel signal quality, wherein the signal quality is an $E_c/I_o$ value, and wherein each air interface traffic channel consumes network resources, a network entity capable of selectively releasing network resources, the network entity comprising:

a network interface for providing connectivity with the radio access network;

a processor;

data storage; and program instructions stored in the data storage and executable by the processor to carry out functions including:

(i) for each WCD, determining at least a delta between (i) the signal quality of one of the WCD's assigned air interface traffic channels and (ii) aggregate signal quality of the WCD's assigned air interface traffic channels;

(ii) selecting one or more of the WCDs based on the determined deltas of the WCDs;

(iii) for each selected WCD, selecting at least one, but less than all, of the WCD's assigned air interface traffic channels to release; and (iv) for each selected WCD, releasing each selected air interface traffic channel, thereby making network resources associated with the released air interface traffic channel available for other use.

11. In a wireless communication system in which a radio access network (RAN) serves a plurality of wireless communication devices (WCDs), wherein each WCD has a plurality of assigned air interface traffic channels on which the WCD communicates with the RAN, wherein each air interface traffic channel defines a channel signal quality, and wherein each air interface traffic channel consumes network resources, a method of selectively releasing network resources, the method comprising:

for each WCD, determining a delta between (i) the signal quality of each of the WCD's assigned air interface traffic channels and (ii) aggregate signal quality of the WCD's assigned air interface traffic channels;

selecting one or more of the WCDs based on the determined deltas of the WCDs;

for each selected WCD, selecting at least one, but less than all, of the WCD's assigned air interface traffic channels to release, wherein the selected air interface channels of the WCD have a greater determined delta than the determined delta of each of the air interface traffic channels for the same WCD that are not selected; and for each selected WCD, releasing each selected air interface traffic channel, thereby making network resources associated with the released air interface traffic channel available for other use.

12. In a wireless communication system in which a radio access network (RAN) serves a plurality of wireless communication devices (WCDs), wherein each WCD has a plurality of assigned air interface traffic channels on which the WCD communicates with the RAN, wherein each air interface traffic channel defines a channel signal quality, and wherein each air interface traffic channel consumes network resources, a method of selectively releasing network resources, the method comprising:

calculating an aggregate signal quality of the WCD's assigned air interface traffic channels as a logarithmic sum of the signal qualities of each of the WCD's assigned air interface traffic channels;

for each WCD, determining at least a delta between (i) the signal quality of one of the WCD's assigned air interface traffic channels and (ii) the aggregate signal quality of the WCD's assigned air interface traffic channels;

selecting one or more of the WCDs based on the determined deltas of the WCDs;

for each selected WCD, selecting at least one, but less than all, of the WCD's assigned air interface traffic channels to release; and for each selected WCD, releasing each selected air interface traffic channel, thereby making network resources associated with the released air interface traffic channel available for other use.

* * * * *